US006908197B2

(12) United States Patent
Penn

(10) Patent No.: US 6,908,197 B2
(45) Date of Patent: Jun. 21, 2005

(54) PRISM WITH ANGULAR FILTER

(75) Inventor: Steven M. Penn, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 277 days.

(21) Appl. No.: 10/335,328

(22) Filed: Dec. 31, 2002

(65) Prior Publication Data

US 2003/0123163 A1 Jul. 3, 2003

Related U.S. Application Data

(60) Provisional application No. 60/345,744, filed on Dec. 31, 2001.

(51) Int. Cl.[7] .................. G03B 21/26; G03B 21/28; G03B 21/14; G02F 1/00; H04N 5/74
(52) U.S. Cl. ..................... 353/34; 353/81; 353/97; 348/771
(58) Field of Search .................. 353/33, 34, 37, 353/81, 84, 97; 348/742–743, 771; 359/833, 834

(56) References Cited

U.S. PATENT DOCUMENTS 6,601,974 B1 * 8/2003 Hewlett et al. ............. 353/34
6,637,894 B2 * 10/2003 Dewald et al. ............. 353/97
6,773,120 B2 * 8/2004 Colpaert ..................... 348/771
2003/0123162 A1 * 7/2003 Penn .......................... 359/833
2003/0147158 A1 * 8/2003 Penn .......................... 359/833
2003/0151834 A1 * 8/2003 Penn .......................... 359/833

* cited by examiner

Primary Examiner—Christopher E. Mahoney
(74) Attorney, Agent, or Firm—Charles A. Brill; Wade James Brady, III; Frederick J. Telecky, Jr.

(57) ABSTRACT

A TIR prism for use in projection displays, which enables angular separation of input illumination and projection light. By controlling the critical angle of a TIR surface, a portion of the illumination cone can be made to fail TIR, thereby being removed from the system prior to overlapping the projected light and lowering the image contrast. Since this truncation of the illumination aperture is translated proportionally across all optical apertures, the input aperture can be increased to overcome the loss of image brightness due to removing this portion of the illumination. In addition, other TIR surfaces are incorporated to remove unwanted diffracted light from OFF-pixels and flat-surfaces soon after this light enters the prism, preventing it from scattering into the desired projected light path from the ON-state pixels. Also, the projector's lamp reflector(s) and light integrator can be shaped to provide a "D" shaped aperture, defined by the TIR prism, for collection and transmission of projected light having optimal brightness and contrast.

30 Claims, 9 Drawing Sheets

PRISM WITH ANGULAR FILTER

CROSS-REFERENCE TO RELATED APPLICATIONS

This application claims priority under 35 USC § 119(e)(1) of provisional application No. 60/345,744 tiled Dec. 31, 2001.

This invention is related to the invention disclosed and claimed in co-pending U.S. patent application No. 10/331832, filed on Dec. 30, 2002, the contents of which are hereby incorporated by reference in this Application.

FIELD OF THE INVENTION

The present invention relates to optical elements used in SLM projection systems and more particularly to high contrast TIR prisms, which separates and discards any portion of the input light before it reaches the SLM, which would normally overlap the projected output light.

BACKGROUND OF THE INVENTION

In a typical spatial light modulator (SLM) projection system, such as a digital micromirror device (DMD) based system, there are two types of illumination problems that can lower the system contrast; (1) a portion of the input illumination can overlap some of the projected light from the ON pixels, lowering the system contrast and (2) unwanted off-state and flat-state light, can diffract and scatter into the projected image illumination path, further reducing the image contrast. This unwanted diffracted light can result from scattering of light off various surfaces, such as mirrors transitioning from ON-to-OFF or OFF-to-ON states, device package, device structure, window, and prisms.

It is known from experimental and analytical data that input illumination rays at angles closest to the projection axis contribute most to diffraction contrast problems. Attempts have been made to increase the illumination angle further away from the projection axis to address the diffraction problem, but this typically has the unacceptable result of reduced image brightness or non-uniformity.

A significant portion of the diffracted light is at an angle that gets collected by the projection optics and as a result is projected on to the display screen as undesirable background light. Diffracted light is most evident on the screen when the SLM is in the OFF-state, lighting up the screen where the image is supposed to be very dark. Even with most of the pixels in the ON-state, diffracted and scattered light will brighten portions of the image area that is intended to be dark, thereby lowering the image contrast.

Current approaches to this problem have been to increase the angle of illumination by 2-4 degrees. For example, for a DMD with mirrors that tilt ±10-degrees, the input illumination angle is normally 20-degrees. Changing this angle to 22-degrees makes the approach angle shallower and thereby reduces the diffracted light rays that enter the projection aperture. However, there is a compromise of an additional 2-degrees of light on the far side of the cone that misses the aperture and is lost, thereby reducing the brightness of the image. Attempts to recover this lost light have been made by increasing the illumination aperture, but this results in additional diffraction and overlapping cones of projection and flat-state light, which in turn tends to further decrease the contrast.

In addition, several approaches have been tried to manage tile OFF-state and flat-state light by the use of baffles or apertures in the projection light path. But apertures that pass the projection light also pass any OFF-state and flat-state light that spatially and angularly overlaps the aperture region. Other methods use a TIR prism surface to pass the projection rays, but this requires three prism elements; i.e., one to TIR the illumination rays, one to TIR the flat-state and OFF-state rays, and a third one to add a wedge of glass to compensate for the thickness variation (back working distance) in the projection path. Other approaches direct the unwanted light into an optical heat sink (light trap), often reflecting off various total internal reflective (TIR) surfaces along the optical path, but do this too far along the optical path to prevent overlapping with the desired projection light.

FIG. 1 is a block diagram of a typical single-SLM projection system, which would typically have contrast problems due to overlapping of illumination with projected light and scattering of diffractive light into the projected light beam. This system is comprised of a lamp assembly 100 (illumination source), a condenser lens 102, a rotating color filter wheel assembly 104, an integrator rod 106, relay lenses 108–112, a TIR prism assembly 114, a SLM (DMD) 118, and a projection lens 120.

In operation, light from the lamp assembly 100 is focused to a small spot at the surface of the color filter wheel 104 by means of the condenser lens 102. Sequential color light (R-G-B) coming through the color wheel 104 is integrated by the integrator rod 106 and coupled into a set of relay lenses, made up of a first 108, second 110, and third 112 lens, which shapes the color light beam to fit the optical aperture of a TIR prism 114. The sequential color light being coupled into the TIR prism strikes a first TIR surface 116 at an angle greater than the critical angle of the surface and reflects off the surface on to the surface of a DMD 118. Modulated light is reflected from the ON-mirrors of the DMD 118 back through the TIR prism assembly 114, this time striking the TIR surface 116 at an angle less than the critical angle of the surface, and therefore passes through the surface, out of the prism assembly 114 into the projection lens 120.

The conventional TIR prism of FIG. 1 enables the angular separation of illumination and projected light, as described in FIG. 2. In this ideal case, where there is no scattering or overlapping of light, then foul non-overlapping cones of light exist; i.e., the full illumination cone 204, an ON-state cone 214, a flat-state cone 220, and an OFF-state cone 224. In a bi-stable DMD, light from the lamp 200 striking the surface of the DMD can be reflected from the ON-state 206, the OFF-state 210, and flat-state 208 mirrors in transition or from other flat surfaces in the device. For a DMD having a ±10° tilt angle and −20° illumination angle 202, the center of the projection cone 212 is located at 0°, the center of the light cone 218 reflected from flat-surfaces is located at +20°, and the center of the light cone 222 reflected from OFF-pixel is located at +40°. For example, a DMD with ±10° tilt angle and an f/#3 optics (f/#3=F 228÷D 230=3 for 9.5° beam tilt) using BK7 glass (with n=1.518), produces four non-overlapping cones each having a 19-degree solid cone angle, thereby leaving a ½-degree separation between cones. Light 212 from the projection cone 214 is coupled into a projection lens 216, while unwanted light 218 from the flat-surface cone 220 and unwanted light 222 from the OFF-pixel cone 224 is absorbed in an optical heat sink 226 and discarded. However, in the real world where diffraction and scattering of light exists, some of the unwanted light makes its way into the projection light cone 214 and lowers the contrast of the image. This shows up on the projection screen with background and dark areas of the image not being as dark as they should be, resulting in a "washed out" image. The present invention is about preventing this unwanted light from contaminating the projection cone so that a high-contrast image is projected.

What is needed is an optical approach that (1) removes any portion of the input illumination that might overlap with the projection image along the projection axis, before the illumination reaches the SLM, (2) removes unwanted light from OFF-pixels and flat-surfaces immediately as the light is reflected from the SLM, and (3) recovers the brightness level lost from removing a portion of the input illumination. The present invention accomplishes these goals, using angular separation in a TIR prism, to remove a portion of the input light, before the light can illuminate the SLM and by filtering unwanted light from OFF-state pixels and flat-surfaces away from the projection path, thereby projecting a clean image with high contrast on to the screen. This approach truncates all cones from all SLM states proportionally, thereby allowing the optical aperture to be increased without generating new overlapping cones of output light.

SUMMARY OF THE INVENTION

This invention discloses a TIR prism approach for use in projection displays, which enables angular separation of input illumination and output projection light. By controlling the critical angle of a TIR surface, a portion of the illumination cone can be made to fail TIR, thereby being removed from the system prior to overlapping the projected light and lowering the image contrast. Since the method of this invention truncates all cones of light proportionally, the optical aperture can then be increased to overcome the loss of image brightness due to removing a portion of the illumination. Also, the projector's lamp reflector(s) and light integrator can be shaped to provide a "D" shaped aperture, defined by the TIR prism, for optimal collection and transmission of projected light.

In addition, other TIR surfaces are incorporated to remove unwanted diffracted light from OFF-pixels and flat-surfaces soon after this light enters the prism, preventing it from getting into the desired projected light path from the ON-state pixels.

Finally, all unwanted light, including the overlapping portion of the illumination and the diffracted light from OFF-pixels and flat-surfaces, is routed into an optical heat sink and discarded. As a result, highly pure and optimized light reflected from the ON-pixels is projected on to the display screen to provide a high-brightness, high-contrast image.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

This invention discloses a TIR prism approach for use in projection displays, which enables angular separation of input illumination and output projection light. By controlling the critical angle of a TIR surface, a portion of the illumination cone can be made to fail TIR, thereby being removed from the system prior to overlapping the projected light and lowering the image contrast. To overcome the loss of image brightness due to removing a portion of the illumination, the optical aperture can be increased since all cones of light are truncated proportionally with the removal of a portion of the illumination. Also, the projector's lamp reflector(s) and light integrator can be shaped to provide a "D" shaped aperture, defined by the TIR prism, for optimal collection and transmission of projected light. In addition, this invention enables flat-state and OFF-state light to be further separated from the ON-state light even while the illumination aperture is increased, by incorporating other TIR surfaces to remove this unwanted diffracted light preventing it from getting into the desired projected light path from the ON-state pixels.

Figure 1:
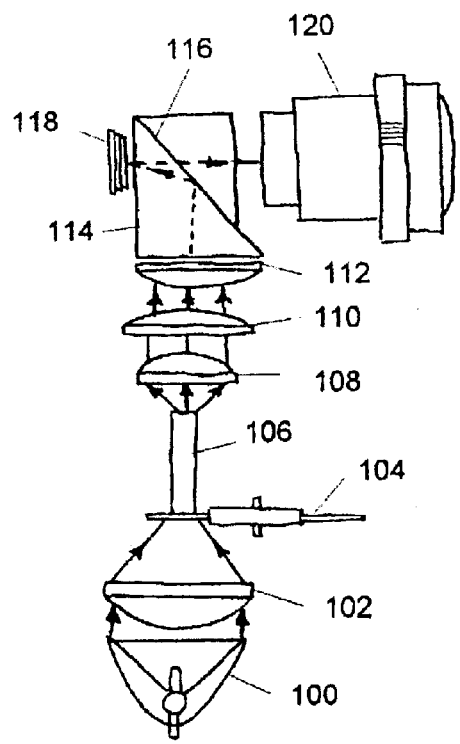
FIG. 1 is a block diagram of a typical single-SLM projection system, which would have contrast problems due to overlapping of illumination with projected light and scattering of diffractive light into the projected light beam.
Figure 2:
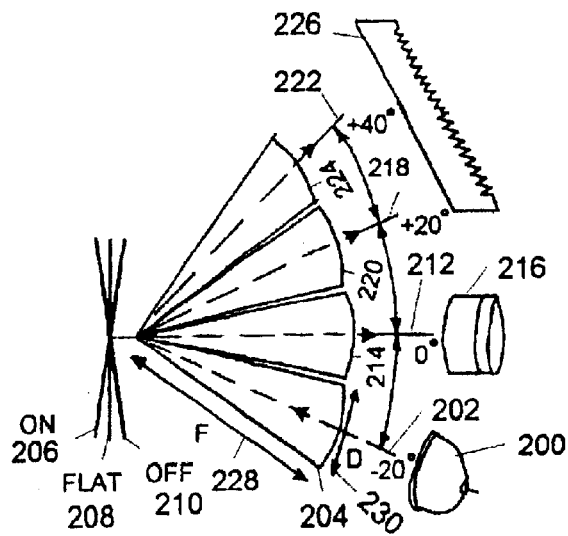
FIG. 2 is a diagram showing the ideal separation of input illumination, projected light, OFF-pixel light, and flat-surface light in the absence of diffractive and scattered light.
Figure 3:
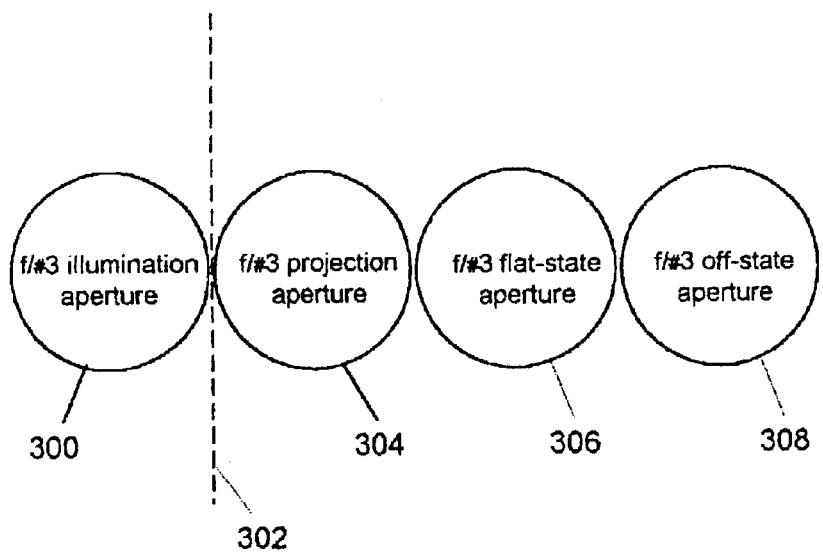
FIG. 3 is a sketch showing the non-overlapping apertures for the four separable light cones in a SLM projection system; i.e., illumination cone, projection light cone, flat-state light cone, and OFF-state light cone.

FIG. 3 is a sketch showing the non-overlapping apertures for the four separable light cones in a DMD projection system; i.e., the illumination cone 300, the projection light cone 304, the flat-state light cone 306, and the OFF-state light cone 308, as discussed in FIG. 2 for the ideal case where there is no diffraction or scattering of light. In this ideal case for an f/#3 system, the input illumination cone 300 is completely separated 302 from the reflected light cones 304–308. The respective light beams are completely contained and separated by approximately ½-degree of angle. However, as stated earlier, due to diffraction and scattering of the light there is some overlap in these apertures, which results in degradation of the system contrast.

The method of the present invention forces a portion of the input illumination to fail TIR by changing the critical angle of the first TIR surface to a lower value, thereby truncating the input aperture and removing a portion of the illumination. For example, for BK7 glass when the critical angle of the TIR surface is changed from 34.6-degrees to 31.7-degrees, it results in a TIR failure of 2.9 (34.6–31.7) degrees (4.5-degrees in air) of illumination. Carrying this a step further, if the TIR prism critical angle is lowered to 30-degrees, the illumination cone is truncated by 4.6-degrees in BK7 glass (7.0-degrees in air), decreasing the diffraction effects even more.

Figure 4:
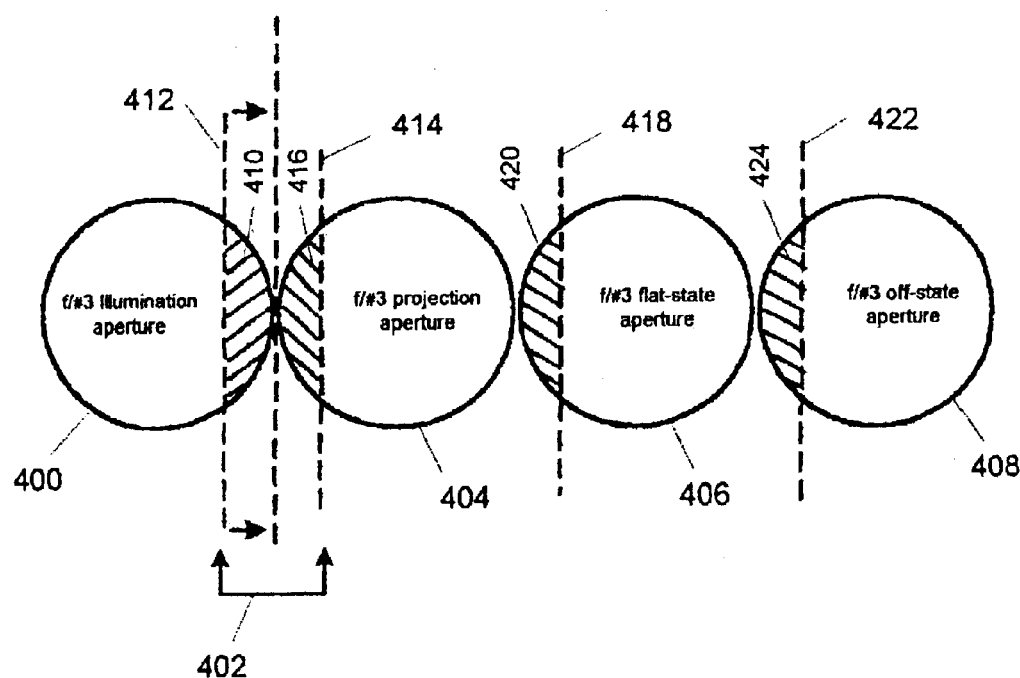
FIG. 4 is an aperture diagram showing the light states of FIG. 3 with a 4.5-degree section of the illumination cone being filtered (removed), using the method of the present invention, and resultant portions of the ON-state projection, flat-state, and OFF-state apertures being truncated.

FIG. 4 is an aperture diagram showing the effects of truncating the light by 4.5-degrees (in air). This shows the four f/#3 apertures, consisting of the illumination aperture 400, the projection aperture 404, the flat-state aperture 406, and the OFF-state aperture 408, with this shows the illumination aperture 400 being truncated (filtered) 412 by 4.5-degrees of angle. Corresponding portions of the reflected cones; i.e., the projection aperture 404, flat-state aperture 406, and OFF-state aperture 408 are also truncated 414, 418, 422 by proportional amounts 416, 420, 424, respectively, providing 4.5-degrees of asymmetrically applied vignetting. This opens a larger gap 402 between the illumination 400 and projection 404 cones, thereby decreasing the effects of diffracted light.

Figure 5:
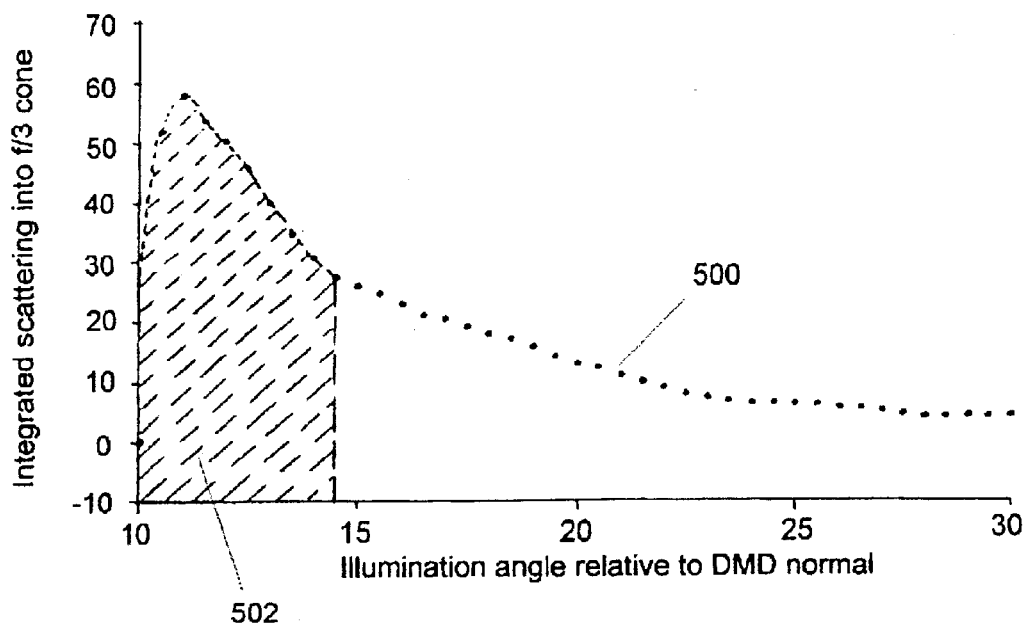
FIG. 5 is a graph showing the amount of diffracted light that is eliminated by removing a 4.5-degree portion of the illumination beam in a DMD projection display.

FIG. 5 is a graph 500 showing the amount 502 of the diffracted light that is eliminated by not exposing the DMD to the 4.5-degree portion of the illumination beam that is removed, as discussed in FIG. 4. However, this loss of illumination results in the undesirable effect of lower brightness in the system, which must be overcome.

Figure 6:
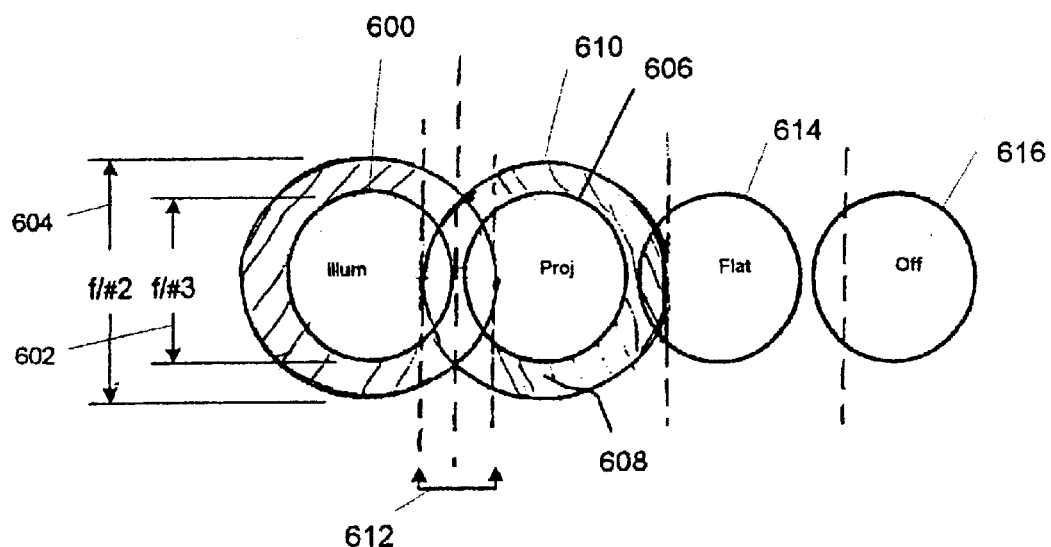
FIG. 6 is a diagram illustrating how the f/#3 illumination and projection apertures are increased to f/#2 apertures to overcome any loss of brightness due to truncating the illumination cone.

As shown in FIG. 6, a further benefit of this invention is the ability to increase the illumination and projection apertures, while the TIR prism simultaneously maintains angular limits to those same apertures. The larger total aperture enables full recovery of the energy lost by the filtering of a significant portion of the illumination aperture. As the illumination input aperture 600 is increased, the reflective output apertures are increased proportionally. The diagram illustrates in this example how the illumination aperture 600 is opened up from an f/#3 602 aperture to a larger f/#2 604 aperture. This in turn provides a larger projection aperture 610, which is opened up from the smaller aperture 606 by the amount 608, thereby providing a gain in the collectable projection aperture. The usable area outside the truncated region 612 is equal to or larger than the original, smaller full aperture 600. As a result, any loss of brightness from removing a portion of the input illumination is overcome by these larger apertures. Also shown are the flat-surface 614 and OFF-state 616 apertures.

Figure 7:
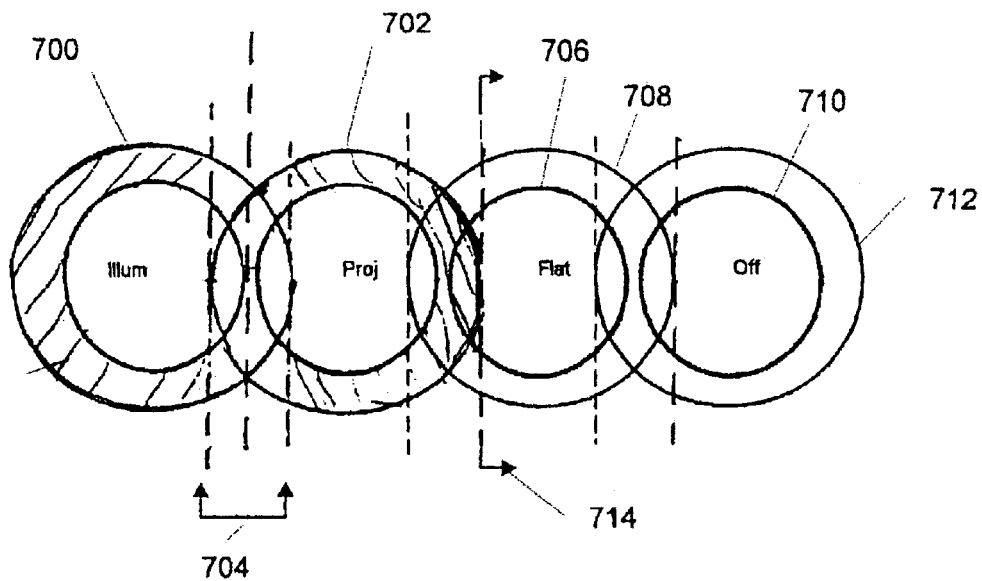
FIG. 7 is a diagram illustrating the additional TIR filtering of OFF-state and flat-state light, along with the increased illumination and projected light apertures shown in FIG. 6.

FIG. 7 is a diagram illustrating the additional TIR filtering of OFF-state and flat-state light, along with the increased illumination and projected light apertures discussed in FIG. 6. This shows the illumination aperture 700 and projection aperture 702 with the truncated area 704 between them, along with the flat-state aperture 708 and the OFF-state aperture 712, which have been proportionally increased from their original apertures 706–710, respectively. However, this also shows the addition of a second TIR surface 714, which cleans out and effectively prevents flat-state and OFF-state light from getting into the projection aperture 702. Although the flat-state and OFF-state apertures are proportionally larger, the angle of scattered light, coming from them that otherwise would get into the projection aperture 702, is less than the critical angle of this second TIR surface 714 and as a result this unwanted light passes through the surface, out of the prism assembly into an optical heat sink, thereby being filtered from the projection aperture.

Figure 8:
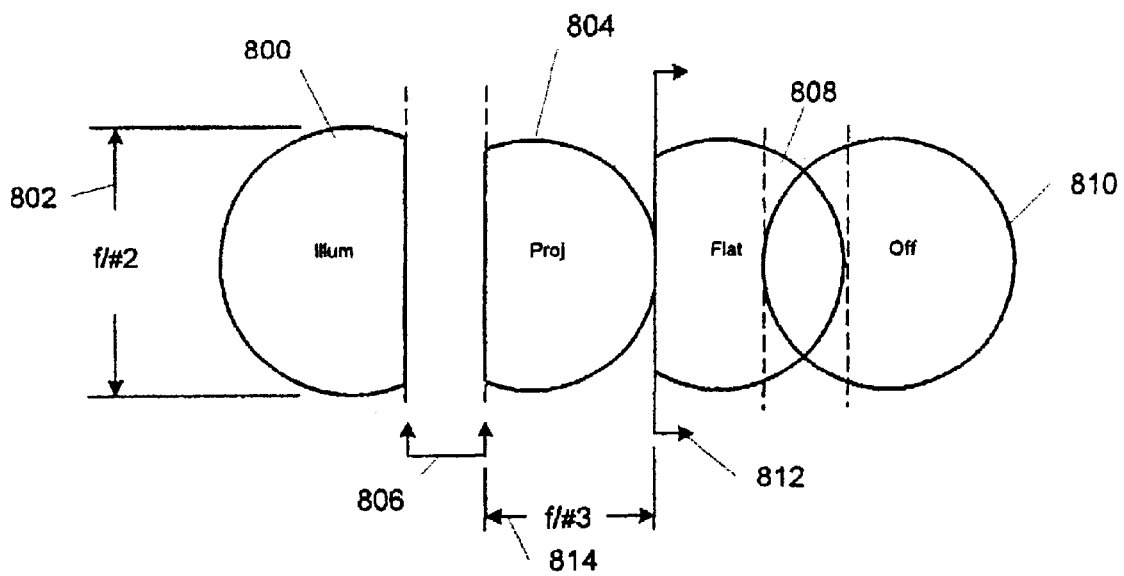
FIG. 8 is a diagram illustrating an f/#2 illumination aperture and an f/#3 projection aperture, which is free from unwanted overlapping and scattered light.

Furthermore, since the aperture is primarily limited only in the DMD tilt direction, an asymmetric aperture is permitted and preferred in some applications to provide a substantial increase in the light output, as illustrated in FIG. 8. Here the resultant projection bundle is a telecentric, filtered, f/#2×f/#3 cone. This shows the f/#2 802 truncated illumination aperture 800, along with the enlarged projection 804, flat-state 808, and OFF-state 810 apertures. The illumination 800 and projection 804 apertures are shown separated by the truncation gap 806. This also illustrates the additional TIR surface 812, which filters any flat-state and OFF-state light from the projection path. This illustrates the asymmetric aperture with the illumination having the full f/#2 802 aperture, but with the projection aperture being limited to an f/#3 814 aperture in the direction of the DMD tilt angle.

Figure 9:
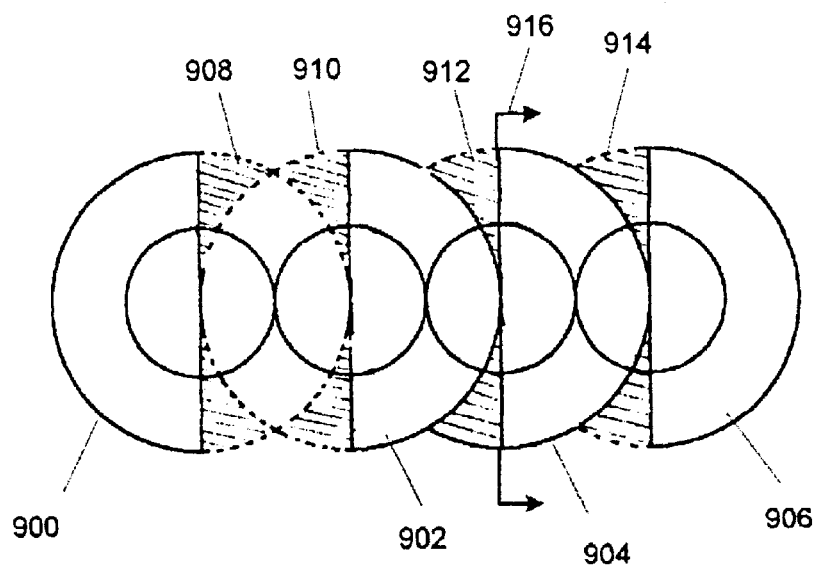
FIG. 9 is a diagram showing "D" shaped apertures, which are used to optimize the total output (brightness) vs. contrast in a SLM based projection display.

FIG. 9 is a diagram showing "D" shaped apertures, which are used to optimize the total output (brightness) vs. contrast in a SLM based projection system. The lamp reflector(s) and light integrator may also be shaped to promote the most efficient collection and transmission of light into the "D" shaped aperture defined by the TIR prism. This figure shows the illumination aperture 900, the projection aperture 902, the flat-state aperture 904, and the OFF-state aperture 906, along with each aperture's areas of filtered light 908–914. Also shown is the TIR filtering 916 for the OFF-state and flat-state reflected light.

Figure 10:
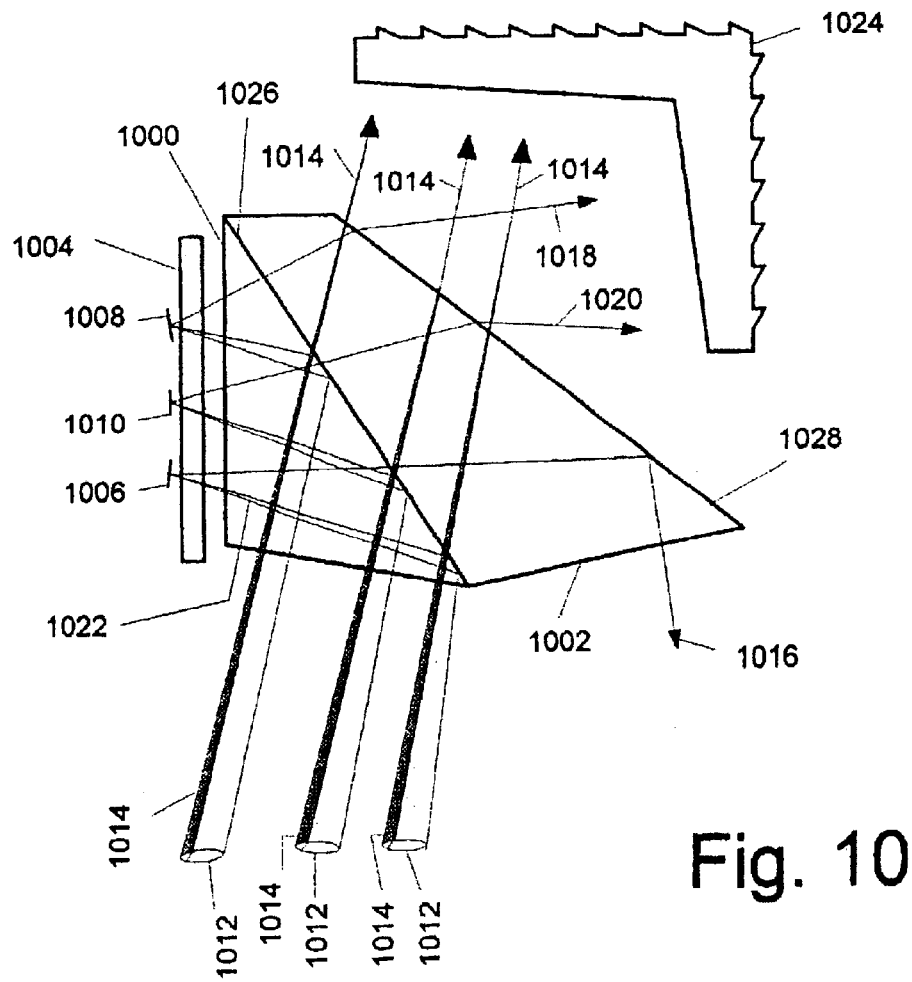
FIG. 10 is a block diagram of the TIR prism for the preferred embodiment of the present invention, which removes the portion of the input illumination that overlaps the projection light, opens the illumination aperture to overcome the loss of brightness by removing the overlapping light, and filters the flat-state and OFF-state light.

FIG. 10 is a block diagram of the TIR prism for the preferred embodiment of the present invention, which removes the portion of the input illumination that overlaps the projection light, filters the flat-state and OFF-state light, and opens the illumination aperture to overcome the loss of brightness caused by removing the overlapping light. This embodiment consists of a two-element TIR prism. A first element 1000 for removing the portion of light 1014 from the input illumination 1012 that would normally overlap with the projected cone of light and reflecting the remaining input light 1022 on to the surface of a SLM 1004. The removed portion of the input light 1014 is directed into an optical heat sink 1024 and discarded. The second prism element 1002 is used to separate the projected modulated light 1016 reflected from the ON-state pixels 1006 from the reflected OFF-stated 1018 and flat-state 1020 light coming from the OFF-pixels 1008 and flat-surfaces/pixels 1010, respectively.

In operation, the largest portion of the input illumination 1022 strikes a first TIR surface 1026 at an angle greater than the critical angle of the surface and is reflected on to the surface of the SLM 1004 to be modulated. However, a smaller portion 1014 of the input illumination, which would normally tend to overlap with the projection cone being reflected off the surface of the SLM, is made to strike this TIR surface at an angle less than the critical angle of the TIR surface, thereby passing through the surface into the second TIR prism element 1002 where it strikes a second TIR surface 1028 at an angle less than the critical angle of the surface, and passes through the surface, exiting the prism assembly into the optical heat sink 1024. Modulated light being reflected from the ON-pixels 1006 strikes the first TIR surface 1026 at an angle less than the critical angle of the surface, passes through the surface and strikes the second TIR surface 1028 at an angle greater than the critical angle of the surface, and is reflected out of tile prism assembly along the projection path 1016. On the other hand, light 1018 coming from the OFF-pixels 1008 and light 1020 from any flat-pixels/surfaces 1010 strikes both the first 1026 and second 1028 TIR surfaces at an angle less than the critical angle of the TIR surfaces, thereby passing through the surfaces, out of the prism assembly into the optical heat sink 1024.

Figure 11:
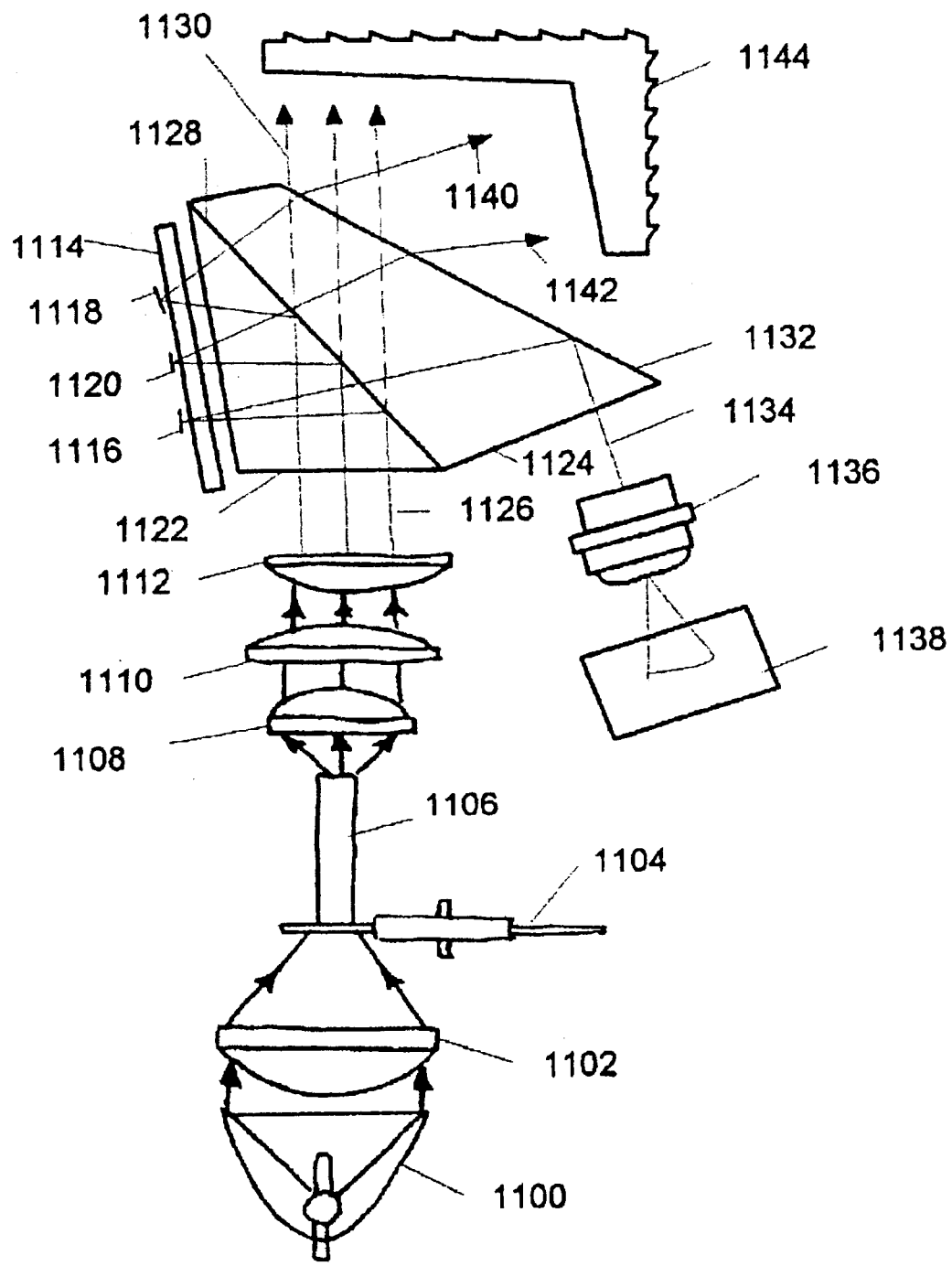
FIG. 11 is a block for a single-DMD projector incorporating the TIR prism of the preferred embodiment of the present invention, as shown in FIG. 10, to provide improved image brightness and contrast.

FIG. 11 is a block for a single-DMD projection system incorporating the TIR prism of the preferred embodiment of the present invention, as shown in FIG. 10, which removes the portion of the input illumination that overlaps the projection light, filters the flat-state and OFF-state light, and opens the illumination aperture to overcome the loss of brightness caused by removing the overlapping light. This system is comprised of a lamp assembly 1100 (illumination source), a condenser lens 1102, a rotating color filter wheel assembly 1104, an integrator rod 1106, relay lenses 1108–1112, a two-element 1122–1124 TIR prism assembly, a SLM (DMD) 1114, a projection lens 1136, a display screen 1138, and an optical heat sink 1144, all being coupled together in an operable manner.

In operation, light from the lamp assembly 1100 passes through the condenser lens 1102 where it is focused to a small spot at the surface of the color filter wheel 1104. Sequential color light (R-G-B) coming through the color wheel 1104 is integrated by the integrator rod 1106 and coupled into a set of relay lenses, made up of a first 1108, second 1110, and third 1112 lens that shapes the color light beam to fit the optical aperture of the TIR prism assembly, which consists of first and second prism elements 1122–1124. The largest portion of the sequential color light 1126 being coupled into the first TIR prism element 1122, strikes the first TIR surface 1128 at an angle greater than the critical angle of the surface and is reflected on to the surface of the SLM 1114. However, a smaller portion 1130 of the input illumination, which would normally tend to overlap with the projection cone being reflected off the surface of the SLM, is made to strike this TIR surface 1128 at an angle less than the critical angle of the TIR surface, thereby passing through the surface into the second TIR prism element 1124 where it strikes a second TIR surface 1132 at an angle less than the critical angle of the surface, and exits the prism assembly into the optical heat sink 1144. Modulated light being reflected from the ON-pixels 1116 strikes the first TIR surface 1128 at an angle less than the critical angle of the surface, passes through the surface and strikes the second TIR surface 1132 at an angle greater than the critical angle of the surface, and is reflected out of the prism assembly along the projection path 1134, through the projection lens 1136, on to the display screen 1138. On the other hand, light 1140 coming from the OFF-pixels 1118 and light 1142 from any flat-pixels/surfaces 1120 strikes both the first 1128 and second 1132 TIR surfaces at an angle less than the critical angle of the TIR surfaces, thereby passing through the surfaces, out of the prism assembly into the optical heat sink 1144.

Figure 12:
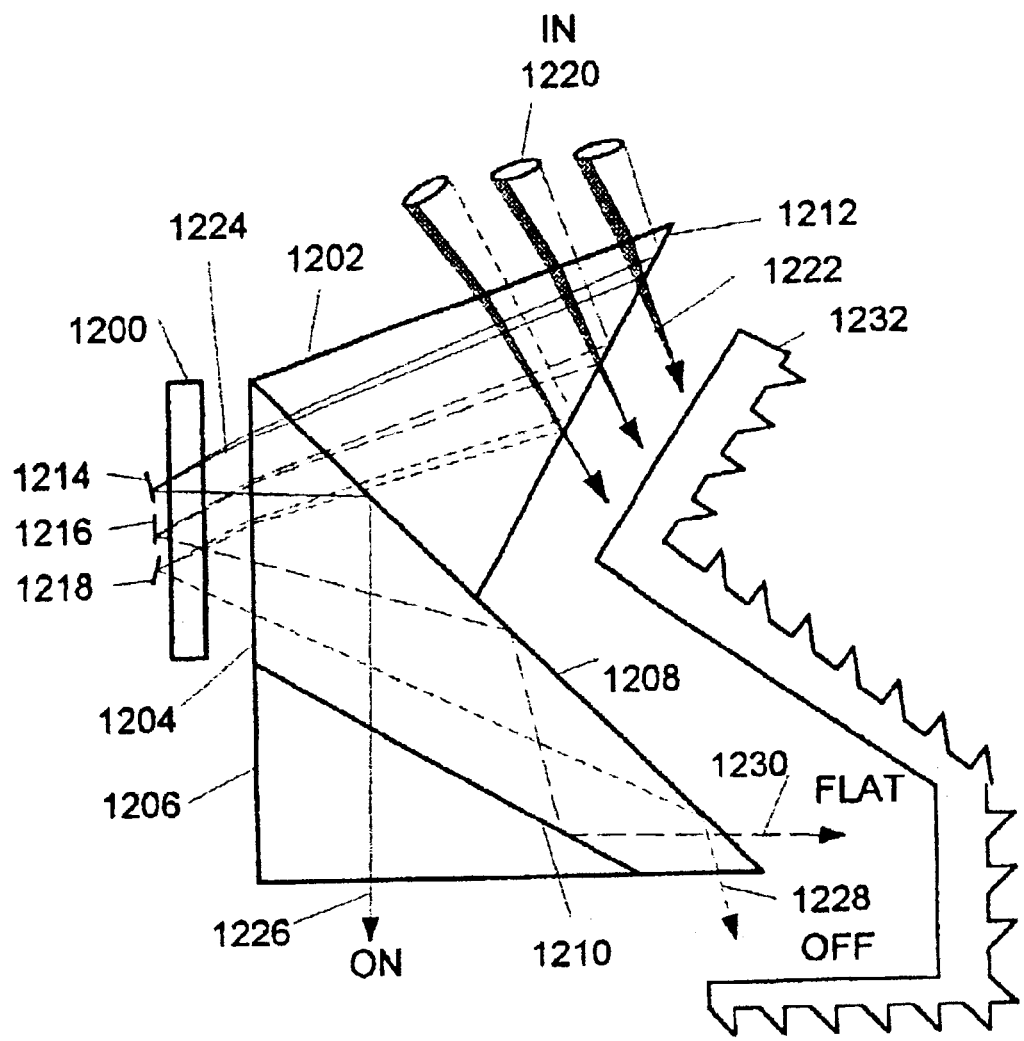
FIG. 12 is a block diagram of a TIR prism for a second embodiment of the present invention, which removes the portion of the input illumination that overlaps the projection light, opens the illumination aperture to overcome the loss of brightness by removing the overlapping light, and filters the flat-state and OFF-state light.

FIG. 12 is a block diagram of a TIR prism for a second embodiment of the present invention, which removes the portion of the input illumination that overlaps the projection light, filters the flat-state and OFF-state light, and opens the illumination aperture to overcome the loss of brightness by removing the overlapping light. This embodiment consists of a three-element TIR prism assembly. A first element 1202 for removing the portion of light 1222 from the input illumination 1220 that would normally overlap with the projected cone of light and reflecting the remaining input light 1224 on to the surface of a SLM 1200. The removed portion of the input light 1222 is directed into an optical heat sink 1232 and discarded. A second prism element 1204 is used to separate the modulated (projected) light 1226 reflected from the ON-state pixels 1214, from the reflected OFF-stated and flat-state light 1228, 1230 coming from the OFF-pixels 1218 and flat-surfaces/pixels 1216, respectively. The third prism element 1206 provides an equal optical working distance for the input and projected output light. The combined prism assembly provides three TIR surfaces 1212, 1208, and 1210. The critical angle of the first TIR surface 1212 is such relative to the input illumination 1220 that a portion of the light is passed through the surface and discarded, while a majority of the light is reflected on to the surface of the SLM 1200. The second and third TIR surfaces 1208, 1210 are used to reflect light from the ON-pixels 1214 along the projection path 1226 and light from the OFF-state pixels 1218 and flat-stated pixels/surfaces 1216 out of the prism assembly into the optical heat sink 1232.

In operation, the largest portion of the input illumination 1220 strikes a first TIR surface 1212 at an angle greater than the critical angle of the surface and is reflected on to the surface of the SLM 1200 to be modulated. A smaller portion 1222 of the input illumination 1220, which would normally tend to overlap with the projection cone of the ON-pixels 1214 being reflected off the surface of the SLM, is made to strike this TIR surface 1212 at an angle less than the critical angle of the TIR surface, thereby passing through the surface directly into an optical heat sink 1232. Modulated light being reflected from the ON-pixels 1214 strikes the second TIR surface 1208 at an angle greater than the critical angle of the surface and is reflected at an angle less than the critical angle of the third TIR surface 1210, passing through the surface, through the third prism element 1206 to maintain an equal working distance for the input and output light, and out of the prism assembly along the projection path 1226. Light 1228 coming from the OFF-pixels 1218 strikes the second TIR surface 1208 at an angle greater than the critical angle of the TIR surfaces, thereby being reflected out of the prism assembly into the optical heat sink 1232, or optionally the angle is such relative to the critical angles of the second and third TIR surfaces 1208, 1210 that the light reflects off these surfaces one or more times before exiting the prism assembly into the heat sink 1232. Finally, light 1230 from the flat-pixels/surfaces 1216 also reflects off the second and third TIR surfaces 1208, 1210 one or more times and then exits the prism assembly into the heat sink 1232. This approach provides a projected light cone, which is relatively free form overlapping input illumination and scattered light from OFF-pixels and other flat surfaces.

Figure 13:
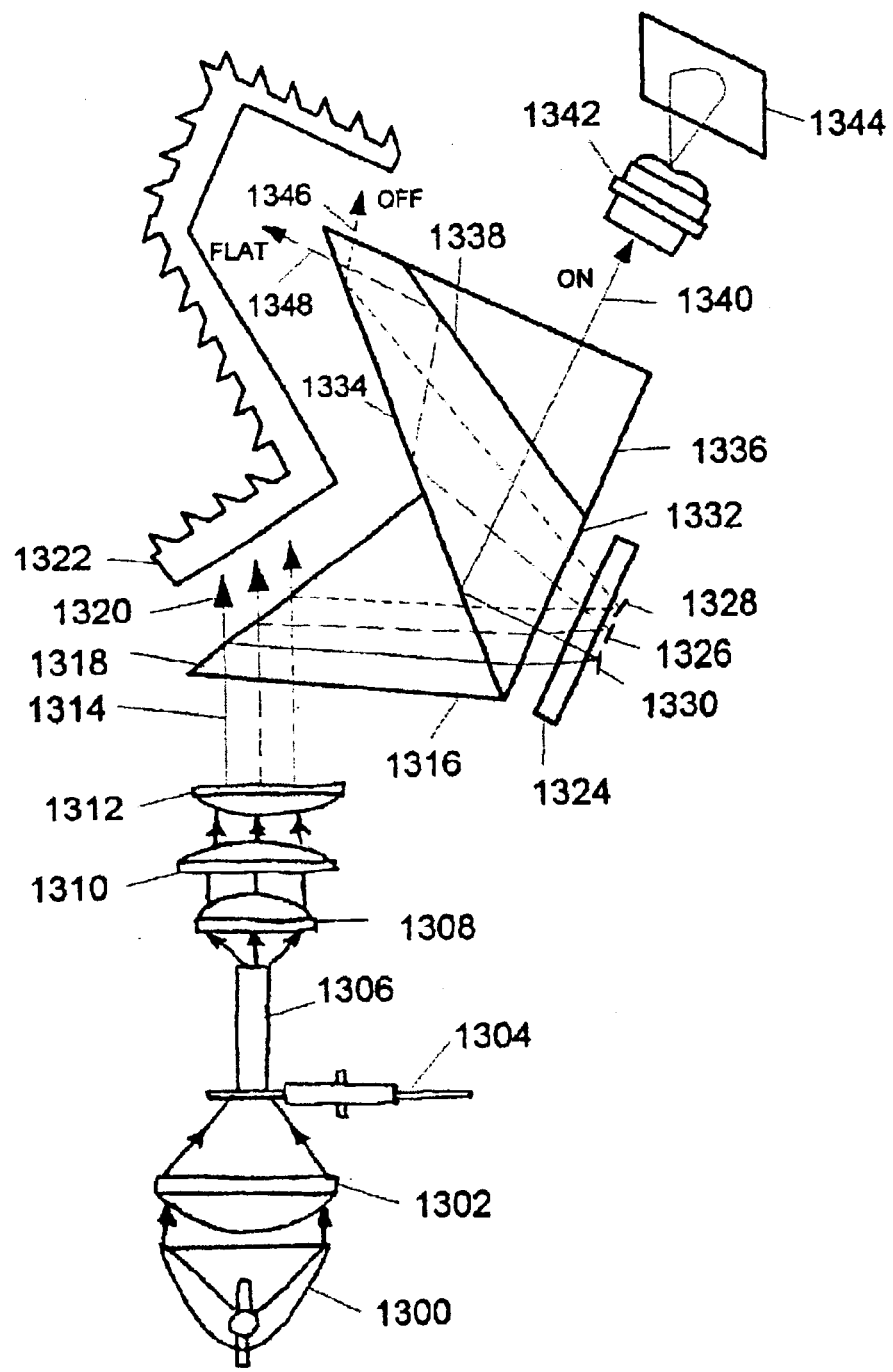
FIG. 13 is a block for a single-DMD projector incorporating the TIR prism of the second embodiment of the present invention, as shown in FIG. 12, to provide improved image brightness and contrast.

FIG. 13 is a block for a single-DMD projection system incorporating the TIR prism of the second embodiment of the present invention, which removes the portion of the input illumination that overlaps the projection light, filters the flat-state and OFF-state light, and opens the illumination aperture to overcome the loss of brightness by removing the overlapping light. This system is comprised of a lamp assembly 1300 (illumination source), a condenser lens 1302, a rotating color filter wheel assembly 1304, an integrator rod 1306, relay lenses 1308–1312, a three-element 1316, 1332, 1336 TIR prism assembly, a SLM (DMD) 1324, a projection lens 1342, a display screen 1344, and an optical heat sink 1322, all being coupled together in an operable manner.

In operation, light from the lamp assembly 1300 passes through the condenser lens 1302 where it is focused to a small spot at the surface of the color filter wheel 1304.

Sequential color light (R-G-B) coming through the color wheel 1304 is integrated by the integrator rod 1306 and coupled into a set of relay lenses, made up of a first 1308, second 1310, and third 1312 tens that shapes the color light beam to fit the optical aperture of the TIR prism assembly, which consists of first, second, and third prism elements 1316, 1332, 1336. The largest portion of the input illumination 1314 strikes the first TIR surface 1318 at an angle greater than the critical angle of the surface and is reflected on to the surface of the SLM 1324 to be modulated. A smaller portion 1320 of the input illumination 1314, which would normally tend to overlap with the projection cone from of the ON-pixels 1330 being reflected off the surface of the SLM, is made to strike this TIR surface 1318 at an angle less than the critical angle of the TIR surface, thereby passing through the surface directly into the optical heat sink 1322. Modulated light being reflected from the ON-pixels 1330 strikes the second TIR surface 1334 at an angle greater than the critical angle of the surface and is reflected at an angle less than the critical angle of the third TIR surface 1338, passing through the surface, through the third prism element 1336, to maintain an equal working distance for the input and output light, out of the prism assembly along the projection path 1340, through the projection lens 1342, and on to the display screen 1344. Light 1346 coming from the OFF-pixels 1328 strikes the second TIR 1334 surface at an angle greater than the critical angle of the TIR surfaces, thereby being reflected out of the prism assembly into the optical heat sink 1322, or optionally the angle is such relative to the critical angles of the second and third TIR surfaces 1334, 1338 that the light reflects off these surfaces one or more times before exiting the prism assembly into the heat sink 1322. Finally, light 1348 from the flat-pixels/surfaces 1326 also reflects off the second and third TIR surfaces 1334, 1338 one or more times and then exits the prism assembly into the heat sink 1322. This approach provides a projected light cone, which is relatively free form overlapping input illumination and scattered light from OFF-pixels and other Sat surfaces.

Figure 14:
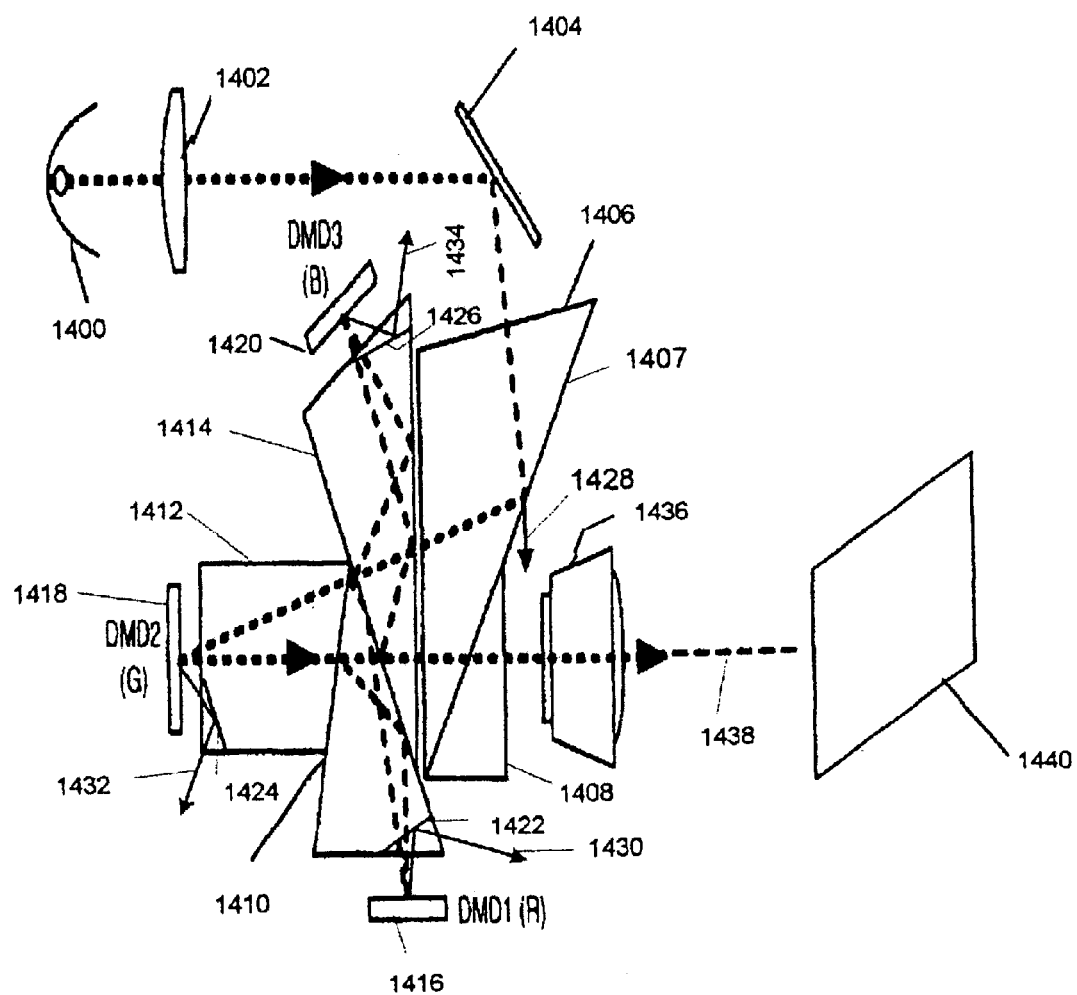
FIG. 14 is a block for a multiple-DMD projector incorporating the TIR prism(s) of the present invention to remove a portion of the input illumination, which would normally overlap the projection light cone, and filters the flat-state and OFF-state light, to provide a high-end projection system with optimal image brightness and contrast.

FIG. 14 is a block for a multiple (two or more)-DMD) projector incorporating a TIR prism 1406 to remove a portion of the input illumination 1428, which would normally overlap the projection light cone, to provide a high-end projection system with optimal image brightness and contrast. This embodiment also incorporates additional TIR prisms 1422–1426 to separate the unwanted light from the OFF-state and/or flat-state from the projected light bundle in each color prism immediately after the unwanted light is reflected from the DMD. This example is for a three DMD high-contrast, high-brightness projection system. The prism assembly incorporates TIR surfaces 1422, 1424, and 1426 as close as possible to the DMD devices (red 1416, green 1418, and blue 1420) to directly receive the unwanted light from the DMDs and direct this light to an optical heat sink (not shown).

This assembly consists of a white light source 1400, which couples light through condensing optics 1402 and off a turning mirror 1404 into an input TIR prism 1406, having a TIR surface 1407. A portion of input white light 1428, which would normally tend to overlap with the projected output light, is made to strike this TIR surface 1407 at an angle less than the critical angle of the surface, thereby passing through the surface into an optical heat sink. However, a majority of the input illumination strikes the TIR surface 1407 at an angle greater than the critical angle of the surface, and is reflected into color splitting/recombining prisms 1410, 1412, and 1414. These color prisms split the light into three continuous, simultaneous red, green, and blue light bundles, which are reflected off respective TIR surfaces on to red 1416, green 1418, and blue 1420 DMDs. Light that is modulated and reflected from the ON pixels of the three DMDs is reflected back into the prisms where it is recombined and reflected back through the TIR surface 1407 of the first TIR prism 1406, through an output prism 1408 that provides an optimal optical working distance, through a projection lens 1436, along a projection path 1438, on to a display screen 1040.

On the other hand, light reflected from the OFF pixels and/or from flat surfaces of the three DMDs enter the respective prisms, at an angle greater than the critical angle of additional TIR surfaces 1422, 1424, 1426 for removing unwanted light, and is immediately reflected out of the prisms as unwanted light 1430, 1432, and 1434, away from the respective projection light bundles, into optical heat sinks.

While this invention has been described in the context of a preferred embodiment, it will be apparent to those skilled in the art that the present invention may be modified in numerous ways and may assume embodiments other than that specifically set out and described above. Accordingly, it is intended by the appended claims to cover all modifications of the invention that fall within the true spirit and scope of the invention.

What is claimed is:

1. A method for improving brightness and contrast in a DMD projection system, comprising:

removing a portion of illumination closest to the projection axis, particularly in the direction crosswise to the DMD mirror tilt axis, truncating the illumination aperture by means of controlling the angle of input illumination relative to the critical angle of a TIR surface, preventing the overlapping between light on to and off of said DMD, thereby improving system contrast;

increasing the optical aperture to compensate for brightness lost from removing said portion of illumination closest to said projection axis, without decreasing said contrast; and removing diffracted light from OFF-pixels and flat-surfaces, by means of additional TIR surfaces, immediately as said light is reflected from the surface of said DMD.

2. The method of claim 1, said removing said portion of illumination comprising:

removing input light rays that overlap projection light from the illumination bundle before they reach said DMD.

3. The method of claim 2, said removing said portion of illumination comprising:

truncating all DMD illumination cones proportionally.

4. The method of claim 1, said increasing said optical aperture comprising:

increasing said illumination aperture in the shape of concentric circles without generating additional overlap between said input and said outgoing light.

5. The method of claim 1, said increasing said optical aperture comprising:
increasing said illumination aperture in a "D" shape fashion without generating additional overlap between said input and said outgoing light.

6. The method of claim 1, further comprising:
reflecting a majority portion of said illumination off a first TIR surface on to the surface of said DMD.

7. The method of claim 1, further comprising:
reflecting the projected light rays from ON-pixels off a second TIR surface out of the optical assembly; and
removing all other unwanted illumination from the optical prism at angles well away from said projected light path.

8. The method of claim 7, said reflecting said projected light comprising:
folding said projected light along a projection path as soon as possible after reflecting off DMD ON mirrors.

9. The method of claim 8, wherein the total projected illumination output level is maintained or increased while contrast is improved, thereby providing improved system performance.

10. The method of claim 7, said removing said unwanted illumination comprising:
reflecting unwanted light from OFF mirrors out of said prism, said light being absorbed by an optical heat sink; and
reflecting unwanted light from flat surfaces out of said prism, said light being absorbed by said optical heat sink.

11. The method of claim 10, wherein said unwanted light is reflected from one or more sources from the group of sources comprising OFF-state mirrors, mirrors transitioning from ON-to-OFF and OFF-to-ON states, DMD borders, package windows, and other flat surfaces in and around said DMD.

12. A TIR prism assembly having angular filters for improved brightness and contrast in a DMD projection system, comprising:
means for improving contrast by removing the portion of input illumination to the DMD that overlaps the projected illumination from the DMD, all DMD illumination cones being truncated proportionally;
said improved contrast further comprising:
folding said projected light as soon as possible after reflecting off DMD ON-pixels;
reflecting unwanted light from OFF mirrors exiting said prism, said light being absorbed by an optical heat sink;
reflecting unwanted light from flat surfaces exiting said prism, said light being absorbed by said optical heat sink; and
increasing the optical aperture to compensate for loss of brightness from removing a portion of the input light that overlaps with said projected light, thereby providing overall higher contrast with equal or greater brightness.

13. The prism assembly of claim 12, said increasing said optical aperture comprising:
increasing said illumination aperture in the shape of concentric circles without generating additional overlap between said input and said outgoing light.

14. The prism assembly of claim 12, said increasing said optical aperture comprising:
increasing said illumination aperture in a "D" shaped fashion without generating additional overlap between said input and said outgoing light.

15. The prism assembly of claim 12, wherein said window of DMD package is eliminated, said DMD package seal being mounted directly to said TIR prism, thereby reducing size, cost, and contamination of said optical assembly.

16. The prism assembly of claim 12, wherein said unwanted light is reflected from one or more sources from the group of sources comprising OFF-state mirrors, mirrors transitioning from ON-to-OFF and OFF-to-ON states, DMD borders, package windows, and other flat surfaces in and around said DMD.

17. The prism assembly of claim 12, further comprising:
a DMD light modulator in a sealed package with optical window mounted in close proximity to a first side of a first TIR prism;
a longest second side of said first TIR prism being bonded to a first side of a second prism, the interface between said first and second prisms providing a first TIR surface having a specified critical angle for separating and removing a portion of input light that overlaps the projected light and reflects a majority of input illumination on to the surface of said DMD;
a second surface of said second prism providing a second TIR surface for reflecting projected ON-pixel light out of said prism;
input light entering said first prism through a third surface of said first prism;
light reflected from the surface of ON-pixels of said DMD having an angle less than the critical angle of said first TIR surface, said light passing through said first prism, said light having an angle greater than the critical angle of said second TIR surface, said light being reflected off said second TIR surface along the system's projection path;
unwanted light reflected from the surface of OFF-pixels of said DMD having an angle less than the critical angle of said first and second TIR surfaces, said light passing through said first and second prisms into an optical heat sink, said light being absorbed; and
unwanted light reflected from flat-surfaces of said DMD having an angle less than the critical angle of said first and second TIR surfaces, said light passing through said first and second prisms into an optical heat sink, said light being absorbed.

18. The prism assembly of claim 12, further comprising:
a first prism for directing a majority of input illumination on to the reflective surface of said DMD, said prism having a first surface for receiving input illumination, a second TIR surface having a first specified critical angle, and a third surface, being attached to the top portion along the longest first side of a second larger prism, said first side of said second prism providing a second TIR surface having a second specified critical angle for directing light from ON pixels of said DMD along a projection light path;
the critical angle of said first TIR surface of said first prism being set to remove a portion of said input illumination closest to the projection axis, particularly in the direction crosswise to the DMD tilt axis, preventing overlap between input and projecting light, thereby increasing the contrast of the projection image;
the longest side of a third prism attached to the bottom second side of said second prism in the projection path of TIR light from said ON pixels to provide an equal optical working distance on both input and output side of the projection cone, said second side of said second prism providing a third TIR surface having a third specified critical angle;

said TIR prism assembly being placed in close proximity to the active reflective area of said SLM to effectively separate the light bundle of said projection light from the light bundles of said OFF and flat light, thereby further increasing the contrast of the projection system;

illumination from the ON pixels of said DMD being reflected on to said second TIR surface at an angle greater than said first specified critical angle, said projected light being reflected off said second TIR surface at an angle less than the said third critical angle of said third TIR surface, through said third prism, along said projection path;

unwanted light from OFF pixels being reflected back into said second prism of said prism assembly at an angle greater than the critical angles of said second and third TIR surfaces, said light reflecting off said surfaces one or more times, out of said prism assembly into said optical heat sink;

unwanted light from flat surfaces and edges in, around, and under the SLM pixels, reflected back into said second prism of said prism assembly at an angle greater than the critical angles of said second and third TIR surfaces, said light reflecting off said surfaces one or more times, out of said prism assembly into said optical heat sink.

19. A single-SLM projection display system having high-brightness and high-contrast, comprising:

a white light source coupled to primary condensing optics, said light being focused to a small spot at the surface of a rotating color filter wheel;

sequential R-G-B color light from said color filter wheel being coupled through optional integrating optics;

said R-G-B color light from said optional integrating optics coupled to relay optics, said light being shaped to match the aperture of a TIR prism assembly;

color light from said relay optics coupled into said prism assembly, said prism assembly having two or more TIR surfaces, each surface having a specified critical angle;

a majority of said light beam striking said a first TIR surface at an angle greater than said specified critical angle of first TIR surface, said majority light being reflected directly on to the surface of said SLM;

a smaller portion of said light beam striking said prism assembly, said portion being the light located nearest the projection axis of said display system, striking said first TIR surface at an angle less than the critical angle of said TIR surface, said smaller portion of said light passing through said first TIR surface, said light being directed out of said prism assembly into an optical heat sink, said light being removed from said system, thereby improving said system's contrast;

said majority light striking said SLM being modulated and reflected off the individual pixels of said SLM;

light from the ON pixels of said SLM being reflected at an angle greater than the critical angle of a second TIR surface in said ON light's path, said light being reflected off said TIR surface out of said prism assembly, through a projection lens, on to a display screen;

unwanted light reflected from the OFF pixels of said SLM being directed, by means of said light angle relative to the critical angles of TIR surfaces in said light's path, away from said projected light path, said light being reflected out of said prism assembly into said optical heat sink and discarded;

unwanted light reflected from flat surfaces and edges in, around, and under the SLM pixels, being directed by means of said lights angle relative to the critical angles of TIR surfaces in said light's path, away from said projected light path, said light being reflected out of said prism assembly into said optical heat sink and discarded.

20. The projection system of claim 19, wherein the shape of said output aperture is that of concentric circles.

21. The projection system of claim 19, wherein said output aperture becomes "D" shaped as the illumination aperture and TIR filtering are increased.

22. The projection system of claim 19, wherein said window of DMD package is eliminated, said DMD package seal being mounted directly to said first side of said first TIR prism, thereby reducing size, cost, and contamination of said optical assembly.

23. The system of claim 19, wherein said SLM is a DMD.

24. The system of claim 19, wherein said TIR prism assembly is further comprised of:

a first input prism having a first TIR surface with a specified critical angle attached to a second output TIR prism having a second TIR surface with a specified critical angle;

input light entering a first external side of said first TIR prism;

a majority of said input light striking said first TIR surface at an angle greater than the critical angle of said TIR surface, said majority light being reflected out through a second external side of said first TIR prism, on to the surface of said SLM;

a smaller minority portion of said input light striking said first TIR surface at an angle less than the critical angle of said first TIR surface, said minority light passing through said first TIR surface, said light striking said second TIR surface at an angle less than the critical angle of said second TIR surface, said portion of light passing through said second TIR surface, out of said prism assembly, into said optical heat sink, removing input light nearest the projection axis, reducing the overlapping of input and projected light, thereby improving the system contrast;

light modulated and reflected from the ON pixels being reflected back into said first TIR prism, said light striking said first TIR surface at an angle less than the critical angle of said first TIR surface, said light passing through said surface into said second TIR prism at an angle greater than the critical angle of said second TIR surface, said light reflecting off said second TIR surface, out of said prism assembly, through a projection lens, on to a display screen;

unwanted light from OFF pixels being reflected back into said prism assembly at an angle less than the critical angles of said first and second TIR surfaces, said light passing through said TIR surfaces, out of said prism assembly into said optical heat sink;

unwanted light from flat surfaces and edges in, around, and under the SLM pixels, reflected back into said prism assembly at an angle less than the critical angles of said first and second TIR surfaces, said light passing through said TIR surfaces, out of said prism assembly into said optical heat sink.

25. The system of claim 19, wherein said TIR prism assembly is further comprised of:
- a first input prism having a first TIR surface with a specified critical angle, said first prism attached to a second prism having a second TIR surface with a specified critical angle, said second prism being attached to a third output prism having a third TIR surface with a specified critical angle;
- input light entering a first external side of said first TIR prism;
- a majority of said input light striking said first TIR surface at an angle greater than the critical angle of said first TIR surface, said majority light being reflected out through a said second prism, on to the surface of said SLM;
- a smaller minority portion of said input light striking said first TIR surface at an angle less than the critical angle of said first TIR surface, said minority light passing through said first TIR surface, out of prism assembly, directly into said optical heat sink, removing input light nearest the projection axis, reducing the overlapping of input and projected light, thereby improving the system contrast;
- light modulated and reflected from the ON pixels being reflected back into said second TIR prism, said light striking said second TIR surface at an angle greater than the critical angle of said second TIR surface, said light reflecting off said second TIR surface, through said second prism, striking said third TIR surface at an angle less than the critical angle of said third TIR surface, through said third prism, out of said prism assembly, through a projection tens, on to a display screen;
- said third prism providing an equal optical working distance for input and outgoing illumination;
- unwanted light from OFF pixels being reflected back into said second prism of said prism assembly at an angle greater than the critical angles of said second and third TIR surfaces, said light reflecting off said surfaces one or more times, out of said prism assembly into said optical heat sink;
- unwanted light from flat surfaces and edges in, around, and under the SLM pixels, reflected back into said second prism of said prism assembly at an angle greater than the critical angles of said second and third TIR surfaces, said light reflecting off said surfaces one or more times, out of said prism assembly into said optical heat sink.

26. A high contrast, multi-SLM, projection display system, comprising:
- a white light source coupled through condensing optics, said light then being reflected off a turning mirror into a first TIR prism, said prism having a TIR surface with specified critical angle;
- a majority of said white light striking said TIR surface at an angle greater than the critical angle of said surface, said majority light being reflected off said TIR surface into two or more color splitting TIR prisms;
- a smaller minority portion of said white light beam striking said first TIR surface at an angle less than the critical angle of said TIR surface, said smaller portion passing through said first TIR surface, said light being directed out of said prism assembly into an optical heat sink, said light being the portion of light located nearest the projection axis of said display system, said light being removed from said system, preventing the overlapping of light on to and off of said SLM surface, thereby improving said system's contrast;
- SLM devices, corresponding to each color, mounted in close proximity to an interfacing surface of each color prism;
- color light simultaneously reflecting off the TIR surfaces in said color prisms on to the active surface of said respective SLM devices, said SLM devices modulating corresponding color light;
- light projected off the ON pixels of said SLM devices being recombined in recombination optics, said light then being passed through an output optical element to provide optimal optical working distance, and through a projection lens on to a display screen;
- each said color prism having a TIR surface in close proximity to said SLM device interfacing surface, said TIR surface having a specified critical angle for reflecting unwanted light being reflected off the surface of said SLM into said optical heat sink;
- unwanted light being reflected from the OFF pixels of said SLM devices being reflected on to said respective TIR surfaces, said light striking said TIR surfaces at an angle greater than the critical angle of said surfaces and being immediately reflected off said TIR surface away from said projection path, into said optical heat sink, thereby further separating said unwanted light from said projected light, increasing the contrast of the projection system; and
- unwanted light reflected off flat surfaces and edges in, around, and under said pixels of said SLM devices being reflected on to said respective TIR surfaces, said light striking said TIR surfaces at an angle greater than the critical angle of said surfaces and being immediately reflected off said TIR surface away from said projection path, into said optical heat sink, thereby further separating said unwanted light from said projected light, increasing the contrast of the projection system.

27. The projection system of claim 26, wherein the shape of said output aperture is that of concentric circles.

28. The projection system of claim 26, wherein said output aperture becomes "D" shaped as the illumination aperture and TIR filtering are increased.

29. The projection system of claim 26, wherein said window of DMD package is eliminated, said DMD package seal being mounted directly to said first side of said first TIR prism, thereby reducing size, cost, and contamination of said optical assembly.

30. The system of claim 26, wherein said SLM is a DMD.

* * * * *